3,732,283
Patented May 8, 1973

3,732,283
SUBSTITUTED NITROALKYL NITRATE AND
PEROXYNITRATE
William M. Cummings, Fishkill, N.Y., assignor to
Texaco Inc., New York, N.Y.
No Drawing. Filed May 17, 1971, Ser. No. 144,212
Int. Cl. C07c 77/02
U.S. Cl. 260—466  17 Claims

ABSTRACT OF THE DISCLOSURE

Nitroalkyl nitrate and peroxynitrates characterized by the formula:

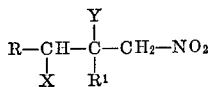

where R and $R^1$ are hydrogen or alkyl or from 1 to 10 carbons, where X is $R^2O-$, $-CN$, Cl, phenyl, $-ONO_2$, $$-O-\overset{O}{\underset{\|}{C}}-CF_3, -O-\overset{O}{\underset{\|}{C}}-R^3$$

where $R^2$ is alkyl of from 1 to 10 carbons or phenyl and $R^3$ is hydrogen, phenyl or alkyl of from 1 to 10 carbons, and where Y is $-OONO_2$ or $-ONO_2$, said nitroalkyl nitrates being prepared by first contacting a substituted alkene of the formula:

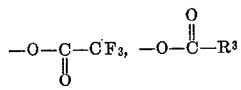

where R, $R^1$ and X are as heretofore defined with a mixture of dinitrogen tetroxide and oxygen to form substituted nitroalkyl peroxynitrate of the formula:

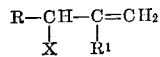

where R, $R^1$ and X are as heretofore defined and second contacting said peroxynitrate with a reducing agent to form said substituted nitroalkyl nitrate, the first and second contacting being conducted in the presence of inert liquid. The nitroalkyl nitrate final products of the invention are useful as fuel additives to increase power output of petroleum distillates such as gasoline and kerosene. Further, they are useful as intermediates in the preparation of surfactants, fuel and lubricant additives, insecticides, fungicides (e.g. controlling early blight in bean plants), pharmaceuticals and polymers.

BACKGROUND OF INVENTION

In the area of petroleum additives there is continual demand for single additives to perform multiple functions. These multipurpose additives are often the result of the sum of the functions of the substituent groups, each substituent contributing to one or more functions. Further, compounds of multisubstituents are also in demand as building block intermediates in specialty product manufacture. Often the formation of such multisubstituents is difficult to accomplish since the adding of one substituent to a hydrocarbon backbone often results in the undesired prevention, modification or removal of one or more of the other desired substituents thereon or to be placed thereon.

DESCRIPTION OF THE INVENTION

I have discovered and this constitutes my invention a new group of nitrate and peroxynitrate compounds containing multiple substituents on a hydrocarbon backbone, the substituent combination in the nitrate subclass being found useful to enhance pour output of petroleum distillates such as gasoline and kerosene. In addition, said nitrate subclass is useful in the preparation of surfactants, lubricant additives, insecticides, fungicides, pharmaceuticals and polymers, e.g., their conversion via reduction to amine followed by reaction with ethylene oxide to form surfactants. In respect to further uses, acetoxynitroalcohols prepared by hydrogenating acetoxy nitro nitrates are useful as intermediates in the formation of aminodiols which would have use as monomers for dispersant type additives, as substances for gas scrubbers and as solvents for extraction processes.

I have unexpectedly discovered that the procedure as generally outlined in U.S. 3,282,983 is suitable to prepare the multisubstituted products of the invention. One reason for this unexpectedness prior to the invention was it was not known what the effect of allylic substitution would do to the nitroxidation sequence. Some of the alternative chemical pathways which said procedure could have taken but did not are as follows:

(1) The functional group in the allylic position could stabilize any incipient radical being formed at said position. The radical would have been formed by attack at this position by nitrogen dioxide or oxygen. Functional groups such as Cl, $\phi-$ and $-OR$ are known to stabilize radicals. If allylic nitroxidation had occurred, a complex mixture would have formed rather than the subject products.

(2) If the free radical resulting from the addition of nitrogen dioxide to the double bond was stabilized a possibility could exist that the addition of oxygen might become reversible and more dinitro compound would form. Substituents such as

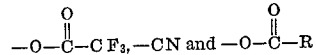

might have been able to stabilize the free radical via a cyclic intermediate.

(3) Nitrogen dioxide does coordinate with compounds containing hetero-atoms. It was thought that this cooxidation might affect the path of the reaction by tying up the nitrogen dioxide causing the nitroalkyl peroxy radical to decompose to nitroalkyl ketones and alcohols rather than forming the compounds.

Specifically, I have discovered a new class of compounds characterized by the formula:

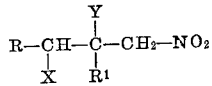

where R and $R^1$ are hydrogen or alkyl of from 1 to 10 carbons and X is selected from the group consisting of

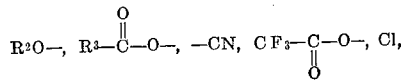

phenyl ($\phi$) or $-ONO_2$ where $R^2$ is alkyl of from 1 to 10 carbons or phenyl and $R^3$ is hydrogen, alkyl of from 1 to 10 carbons or phenyl and where Y is $-ONO_2$ or $-OONO_2$.

The products of the invention are prepared in a two-stage process as follows:

STAGE I

In the first stage a substituted alkene of the formula:

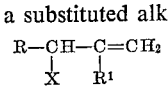

where R, $R^1$ and X are as heretofore defined, is contacted simultaneously with dinitrogen tetroxide and oxygen in a mole ratio substituted alkene to dinitrogen tetroxide to oxygen of between about 1:0.5:1 and 1:1.5:30 at a temperature between about −40 and 20° C. to form a substituted nitroalkyl peroxynitrate characterized by the formula:

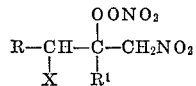

where R, $R^1$ and X are as heretofore defined.

Under preferred conditions, oxygen and dinitrogen tetroxide are respectively introduced into the reaction system at a rate of between about 0.5 and 1.8 liters/minute/kilogram substituted olefins and between about 2 and 20 grams/minute/kilogram substituted alkene. For optimum results it is desirable to adjust conditions of the first stage within the described condition framework so that the reaction mixture remains essentially colorless.

If desired, the formed substituted nitroalkyl peroxynitrate intermediates are normally purified by stripping off of volatiles under reduced pressure or, if of a high enough molecular weight, isolated as insoluble material, e.g., via filtration.

The first stage reaction is also advantageously conducted in the presence of an inert liquid diluent in order to facilitate contact between the substituted alkene, tetroxide and oxygen reactants. The inert liquid diluent desirably constitutes between about 75 and 90 wt. percent of the reaction mixture. Examples of suitable inert diluents contemplated herein are those inert liquid diluents having a boiling point between about 30 and 100° C. such as n-hexane, heptane, diethylether and carbon tetrachloride, the latter being most preferred.

The reaction time of the first stage is normally the time it takes to pass the desired dinitrogen tetroxide into the substituted alkene containing solution.

It is to be noted the dinitrogen tetroxide employed is actually an equilibrium mixture of dinitrogen tetroxide and nitrogen dioxide with the equilibrium being given to essentially 100% dinitrogen tetroxide at 0° C. and essentially 100% nitrogen dioxide at 140° C. at 1 atmosphere pressure. Therefore, hereinbefore and hereinafter the terms "dinitrogen tetroxide" and "nitrogen dioxide" refer to the equilibrium mixture of $N_2O_4$ and $NO_2$ present at the particular temperature described.

The oxygen employed may be in the form of pure oxygen or a mixture, e.g., air or in admixture with inert gas such as nitrogen.

STAGE II

The recovered substituted nitroalkyl peroxynitrate from the first stage is then contacted with a reducing agent at a temperature between about −20 and 30° C. in a mole ratio of substituted nitroalkyl peroxynitrate to reducing agent of between about 1:1 and 5:1 to form the nitroalkyl nitrate product characterized by the formula:

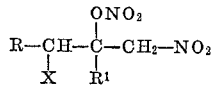

where R, $R^1$ and X are as heretofore defined. The reaction is normally conducted for the length of time required to add the reducing agent. When the reaction is conducted below room temperature, the final reaction mixture is allowed to warm to room temperature before workup.

The resultant substituted nitroalkyl nitrate can be recovered by standard means such as via fractional distillation under reduced pressure, chromatography and selective removal of impurities by solid absorbents. Generally, fractional distillation is not employed with separation of low molecular weight products due to their heat and shock sensitivity.

As in the first stage, inert liquid diluent is advantageously employed in an amount of between about 80 and 90 wt. percent based on the reaction mixture to facilitate contact of the reducing agent with the peroxynitrate and normally is the very same inert liquid employed in the first stage. Examples of this inert diluent are those inert liquid diluents recited as suitable in the first stage.

Specific examples of the reducing agents contemplated herein are nitric oxide, trialkylphosphite of 3 to 6 carbons such as trimethylphosphite, triethylphosphite, sulfur dioxides, alkali metal sulfite, bisulfites and thiosulfites such as sodium sulfites, potassium sulfites, sodium disulfites, potassium thiosulfites, aqueous solutions of ferrous salts such as aqueous solutions of ferric chloride and ferrous sulfate.

Then procedure can be further described by the following equations utilizing nitric oxide as the reducing agent:

(a)

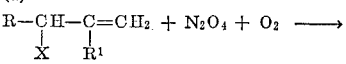

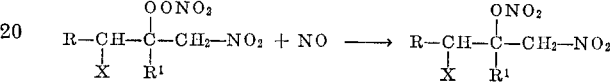

where R and $R^1$ and X are as heretofore defined.

Specific examples of the substituted alkene reactant, nitroalkyl peroxynitrate intermeidate and nitroalkyl nitrate product contemplated herein are as follows:

(a) 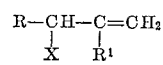

(b) 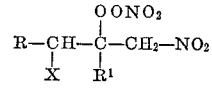

(c) 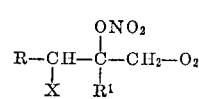

where R and $R^1$ are hydrogen, methyl, pentyl and/or decyl and X is

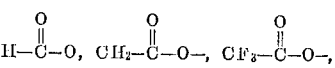

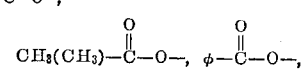

Cl, $CH_3CH_2O-$, $CH_3(CH_2)_7CH_2O-$, $-CN$, $-ONO_2$, $-\phi$ and $-O\phi$.

The following operating examples further illustrate the invention but are not to be construed as limitations thereof.

EXAMPLE I

This example illustrates the preparation of 1-nitro-3-acetoxy-2-propyl peroxynitrate and 1-nitro-3-acetoxy-2-propyl nitrate.

To a 0.13 mole carbon tetrachloride solution of allyl acetate (13 grams in 100 mls. carbon tetrachloride) maintained at 0° C. there was added 8 mls. (0.13 mole) of nitrogen tetroxide over a period of 6 hours. The addition is carried out by allowing a stream of oxygen to pass over the liquid nitrogen tetroxide and thence into the reaction vessel. The mole ratio of nitrogen dioxide to oxygen remained at about 1:20 during the reaction. After the nitrogen tetroxide has been added, the oxygen is allowed to flow through the reaction mixture until the solution becomes colorless. Infrared analysis (0.1 mm. NaCl cell) of the solution showed that the 1-nitro-3-acetoxy-2-propyl peroxynitrate was present therein (bands at 5.8, 6.4, 7.3 mu). The solvent can be removed therefrom under reduced pressure (about 1–2 mm. Hg) to give neat peroxynitrate.

The solution prepared in Stage I was cooled to −10° C. There was added 0.055 mole of nitric oxide by passing the nitric oxide through a solution at a flow rate of 60.8 ml. per minute. After this addition, the solution was kept at −10° C. for 30 minutes and then allowed to warm to room temperature. The solvent is removed in vacuum to give 21 grams (90% yield) of 1-nitro-3-acetoxy-2-propyl nitrate.

EXAMPLE II

This example illustrates the preparation, yield and analysis of a series of specific substituted nitroalkyl nitrate products encompassed by the invention.

1-nitro-3-formyloxy-2-propyl nitrate

To a 0.13 mole (11.2 grams) carbon tetrachloride solution of allyl formate there was slowly added 8 mls. (0.13 mole) of nitrogen tetroxide at about 0–15° C. always maintaining the reaction solution colorless. The addition was carried out by allowing a stream of oxygen to pass over the liquid nitrogen tetroxide and thence (20:1 oxygen/nitrogen dioxide mole ratio) into the reaction vessel. After the addition, the system was swept with oxygen for 30 minutes and the resultant solution was determined to contain 1-nitro-3-formyloxy-2-propyl peroxynitrate.

This solution was then cooled to −10° C. and 0.13 mole of nitric oxide was added at a flow rate of 60.8 ml./min. After this, the solution was kept at −10° C. for 30 minutes and then allowed to warm to room temperature. The solvent was removed in vacuum to give 17.5 grams (70% yield) of 1-nitro-3-formyloxy-2-propyl nitrate.

1-nitro-3-trifluoroacetoyloxy-2-propyl nitrate

To a 0.13 mole (20 grams) carbon tetrachloride solution of allyl trifluoroacetate there was slowly added 80 mls. (0.13 mole) of nitrogen tetroxide at about 0–5° C. always maintaining the solution reaction colorless. The addition was carried out by allowing a stream of oxygen to pass over the liquid nitrogen tetroxide and thence (20:1 oxygen/nitrogen dioxide mole ratio) into the reaction vessel. After the addition, the system was swept with oxygen for 30 minutes and the resultant solution was determined to contain 1-nitro - 3 - trifluoroacetoyloxy-2-propyl peroxynitrate.

This solution was then cooled to −10° C. and 0.13 mole of nitric oxide was added at a flow rate of 60.8 ml./min. After this, the solution was kept at −10° C. for 30 minutes and then allowed to warm to room temperature. The solvent was removed in vacuum to give 21.8 grams. (65% yield) of 1-nitro-3-trifluoroacetoyloxy-2-propyl nitrate.

1-nitro-2-methyl-3-acetoyloxy-2-propyl nitrate

To a 0.13 mole (14.6 grams) carbon tetrachloride solution of methallyl acetate there was slowly added 8.0 mls. (0.13 mole) of nitrogen tetroxide at about 0–5° C. always maintaining the reaction solution colorless. The addition was carried out by allowing a stream of oxygen to pass over the liquid nitrogen tetroxide and thence (20:1 oxygen/nitrogen dioxide mole ratio) into the reaction vessel. After the addition, the system was swept with oxygen for 30 minutes and the resultant solution was determined to contain 1-nitro-2-methyl-3-acetoyl-2-propyl peroxynitrate.

This solution was then cooled to −10° C. and 0.13 mole of nitric oxide was added at a flow rate of 60.8 mls./minute. After this, the solution was kept at −10° C. for 30 minutes and then allowed to warm to room temperature. The solvent was removed in vacuum to give 25.0 grams (85% yield) of 1-nitro-2-methyl-3-acetoyloxy-2-propyl nitrate.

1-nitro-3-propionoyloxy-2-propyl nitrate

To a 0.13 mole (15.2 grams) carbon tetrachloride solution of allyl propionate there was slowly added 8.0 mls. (0.13 mole) of nitrogen tetroxide at about 0–5° C. always maintaining the reaction solution colorless. The addition was carried out by allowing a stream of oxygen to pass over the liquid nitrogen tetroxide and thence (20:1 oxygen/nitrogen dioxide mole ratio) into the reaction vessel. After the addition, the system was swept with oxygen for 30 minutes and the resultant solution was determined to contain 1-nitro-3-propionoyloxy-2-propyl peroxynitrate.

This solution was then cooled to −10° C. and 0.13 mole of nitric oxide was added at a flow rate of 60.8 mls./min. After this, the solution was kept at −10° C. for 30 minutes and then allowed to warm to room temperature. The solvent was removed in vacuum to give 25.5 grams (90% yield) of 1-nitro-3-propionoyloxy-2-propyl nitrate.

1-nitro-3-heptanoyloxy-2-propyl-nitrate

To a 0.13 mole (22.0 grams) carbon tetrachloride solution of allyl heptanoate there was slowly added 8.0 mls. (0.13 mole) of nitrogen tetroxide at about 0–5° C. always maintaining the reaction solution colorless. The addition was carried out by allowing a stream of oxygen to pass over the liquid nitrogen tetroxide and thence (20:1 oxygen/nitrogen dioxide mole ratio) into the reaction vessel. After the addition, the system was swept with oxygen for 30 minutes and the resultant solution was determined to contain 1-nitro-3-heptanoyloxy-2-propyl peroxynitrate.

This solution was then cooled to −10° C. and 0.13 mole of nitric oxide was added at a flow rate of 60.8 ml. min. After this, the solution was kept at −10° C. for 30 minutes and then allowed to warm to room temperature. The solvent was removed in vacuum to give 35 grams (97% yield) of 1-nitro-3-heptanoyloxy-2-propyl nitrate.

1-nitro-3-benzoyloxy-2-propyl nitrate

To a 0.13 mole (21.0 grams) carbon tetrachloride solution of allyl benzoate there was slowly added 8.0 mls. (0.13 mole) of nitrogen tetroxide at about 0–5° C. always maintaining the reaction solution colorless. The addition was carried out by allowing a stream of oxygen to pass over the liquid nitrogen tetroxide and thence (20:1 oxygen/nitrogen dioxide mole ratio) into the reaction vessel. After the addition, the system was swept with oxygen for 30 minutes and the resultant solution was determined to contain 1-nitro-3-benzoyloxy-3-propyl peroxy nitrate.

This solution was then cooled to −10° C. and 0.13 mole of nitric oxide was added at a flow rate of 60.8 ml./min. After this, the solution was kept at −10° C. for 30 minutes and then allowed to warm to room temperature. The solvent was removed in vacuum to give 31.4 grams (91% yield) of 1-nitro-3-benzoyloxy-2-propyl nitrate.

1-nitro-3-nitrato-3-propyl nitrate

To a 0.13 mole (13.5 grams) carbon tetrachloride solution of allyl nitrate there was slowly added 8.0 mls. (0.13 mole) of nitrogen tetroxide at about 0–5° C. always maintaining the reaction solution colorless. The addition was carried out by allowing a stream of oxygen to pass over the liquid nitrogen tetroxide and thence (20:1 oxygen/nitrogen dioxide mole ratio) into the reaction vessel. After the addition, the system was swept with oxygen for 30 minutes and the resultant solution was determined to contain 1-nitro-3-nitrato-2-propyl peroxynitrate.

This solution was then cooled to −10° C. and 0.13 mole of nitric oxide was added at a flow rate of 60.8 ml./min. After this, the solution was kept at −10° C. for 30 minutes and then allowed to warm to room temperature. The solvent was removed in vacuum to give 2.7 grams (10% yield) of 1-nitro-3-nitrato-2-propyl nitrate.

1-nitro-3-chloro-2-propyl nitrate

To a 0.13 mole (10 grams) carbon tetrachloride solution of allyl chloride there was slowly added 8.0 mls. (0.13 mole) of nitrogen tetroxide at about 0–5° C. always maintaining the reaction solution colorless. The addition was carried out by allowing a stream of oxygen to pass over the liquid nitrogen tetroxide and thence (20:1 oxygen/nitrogen dioxide mole ratio) into the reaction vessel. After the addition, the system was swept with oxygen for 30 minutes and the resultant solution was determined to contain 1-nitro-3-chloro-2-propyl peroxynitrate.

This solution was then cooled to −10° C. and 0.13 mole of nitric oxide was added at a flow rate of 60.8 ml./min. After this, the solution was kept at −10° C. for 30 minutes and then allowed to warm to room temperature. The solvent was removed in vacuum to give 17.7 grams (80% yield) of 1-nitro-3-chloro-2-propyl nitrate.

(2-nitrato-3-nitropropyl) ethyl ether

To a 0.13 mole (11.1 grams) carbon tetrachloride solution of allyl ethyl ether there was slowly added 8.0 mls. (0.13 mole) of nitrogen tetroxide at about 0° C. always maintaining the reaction solution colorless. The addition was carried out by allowing a stream of oxygen to pass over the liquid nitrogen tetroxide and thence (20:1 oxygen/nitrogen dioxide mole ratio) into the reaction vessel. After the addition, the system was swept with oxygen for 30 minutes and the resultant solution was determined to contain (2-peroxynitrate - 3 - nitropropyl) ethyl ether.

This solution was then cooled to −10° C. and 0.13 mole of nitric oxide was added at a flow rate of 60.8 ml./min. After this, the solution was kept at −10° C. for 30 minutes and then allowed to warm to room temperature. The solvent was removed in vacuum to give 19.8 grams (80% yield) of (2-nitrato-3-nitropropyl) ethyl ether.

(2-nitrato-3-nitropropyl) phenyl ether

To a 0.13 mole (17.8 grams) carbon tetrachloride solution of allyl phenyl ether there was slowly added 8.0 mls. (0.13 mole) of nitrogen tetroxide at about 0° C. always maintaining the reaction solution colorless. The addition was carried out by allowing a stream of oxygen to pass over the liquid nitrogen tetroxide and thence (20:1 oxygen/nitrogen dioxide mole ratio) into the reaction vessel. After the addition, the system was swept with oxygen for 30 minutes and the resultant solution was determined to contain (2-peroxynitrato-3-nitropropyl) phenyl ether.

This solution was then cooled to −10° C. and 0.13 mole of nitric oxide was added at a flow rate of 60.8 ml./min. After this, the solution was kept at −10° C. for 30 minutes and then allowed to warm to room temperature. The solvent was removed in vacuum to give 24.8 grams (82% yield) of (2-nitrato-3-nitropropyl) phenyl ether.

1-nitro-3-phenyl-2-propyl nitrate

To a 0.13 mole (15.4 grams) carbon tetrachloride solution of allyl benzene there was slowly added 8.0 mls. (0.13 mole) of nitrogen tetroxide at about 0° C. always maintaining the reaction solution colorless. The addition was carried out by allowing a stream of oxygen to pass over the liquid nitrogen tetroxide and thence (20:1 oxygen/nitrogen dioxide mole ratio) into the reaction vessel. After the addition, the system was swept with oxygen for 30 minutes and the resultant solution was determined to contain 1-nitro-3-phenyl-2-propyl peroxynitrate.

This solution was then cooled to −10° C. and 0.13 mole of nitric oxide was added at a flow rate of 60.8 mls./minute. After this, the solution was kept at −10° C. for 30 minutes and then allowed to warm to room temperature. The solvent was removed in vacuum to give 26.0 grams (90% yield) of 1-nitro-3-phenyl-2-propyl nitrate.

1-nitro-3-cyano-2-propyl nitrate

To a 0.13 mole (8.7 grams) carbon tetrachloride solution of allyl cyanide there was solwly added 8.0 mls. (0.13 mole) of nitrogen tetroxide at about 0° C. always maintaining the reaction solution colorless. The addition was carried out by allowing a stream of oxygen to pass over the liquid nitrogen tetroxide and thence (20:1 oxygen/nitrogen dioxide mole ratio) into the reaction vessel. After the addition, the system was swept with oxygen for 30 minutes and the resultant solution was determined to contain 1-nitro-3-cyano-2-propyl peroxynitrate.

This solution was then cooled to −10° C. and 0.13 mole of nitric oxide was added at a flow rate of 60.8 mls./min. After this, the solution was kept at −10° C. for 30 minutes and then allowed to warm to room temperature. The solvent was removed in vacuum to give 15.6 grams (70% yield) of 1-nitro-3-cyano-2-propyl nitrate.

I claim:

1. A nitroalkyl nitrate characterized by the formula:

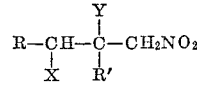

where R and R$^1$ are hydrogen or alkyl of from 1 to 10 carbons, where X is a member selected from the group consisting of

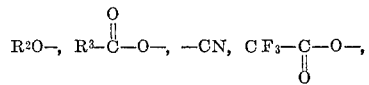

Cl, phenyl, or —ONO$_2$, R$^2$ is alkyl of from 1 to 10 carbons or phenyl, and R$^3$ is hydrogen, phenyl or alkyl of from 1 to 10 carbons, and where Y is —ONO$_2$ or —OONO$_2$.

2. A method of preparing a substituted nitroalkyl nitrate characterized by the formula:

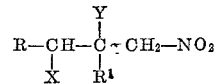

where R and R$^1$ are hydrogen or alkyl of from 1 to 10 carbons and X is a member selected from the group consisting of R$^2$O—,

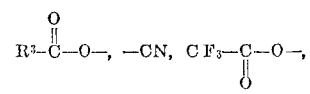

Cl, phenyl, or —ONO$_2$ where R$^2$ is alkyl of from 1 to 10 carbons or phenyl, R$^3$ is hydrogen, phenyl or alkyl of from 1 to 10 carbons, and Y is —ONO$_2$ and —OONO$_2$ (a) simultaneously contacting a substituted alkene of the formula:

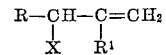

where R, R$^1$ and X are as heretofore defined with oxygen and dinitrogen tetroxide in the presence of inert liquid diluent at a temperature between about −40 and 20° C. in a mole ratio of said alkene to said dinitrogen tetroxide to said oxygen of between about 1:0.5:1 and 1:1.5:30 to form nitroalkyl peroxynitrate characterized by the formula:

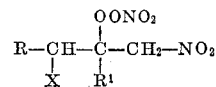

where R, R$^1$ and X are as heretofore defined, (b) contacting said nitroalkyl peroxynitrate in the presence of inert liquid diluent with a reducing agent at a temperature between about −20 and 30° C. utilizing a mole ratio of said nitroalkyl peroxynitrate to said reducing agent of between about 1:1 and 5:1 to form said nitroalkyl nitrate.

3. A method in accordance with claim 2 wherein said reducing agent is trialkyl phosphite of 3 to 6 carbons, nitric oxide, alkali metal sulfite, alkali metal bisulfite, aqueous solutions of ferrous salts and sulfur dioxide.

4. A method in accordance with claim 2 wherein said reducing agent is nitric oxide, said inert liquid diluent is carbon tetrachloride.

5. A nitroalkyl nitrate in accordance with claim 1 where R and R¹ are hydrogen, X is $$\underset{\text{H}-\overset{\text{O}}{\underset{\|}{\text{C}}}-\text{O}-}{}$$

and Y is —ONO₂.

6. A nitroalkyl nitrate in accordance with claim 1 where R and R¹ are hydrogen, X is $$\text{CH}_3-\overset{\text{O}}{\underset{\|}{\text{C}}}-\text{O}-$$

and Y is —ONO₂.

7. A nitroalkyl nitrate in accordance with claim 1 where R and R¹ are hydrogen, X is $$\text{CF}_3-\overset{\text{O}}{\underset{\|}{\text{C}}}-\text{O}-$$

and Y is —ONO₂.

8. A nitroalkyl nitrate in accordance with claim 1 where R and R¹ are hydrogen, X is $$\text{CH}_3\text{CH}_2\overset{\text{O}}{\underset{\|}{\text{C}}}-\text{O}-$$

and Y is —ONO₂.

9. A nitroalkyl nitrate in accordance with claim 1 where R and R¹ are hydrogen, X is $$\text{CH}_3(\text{CH}_2)_6\overset{\text{O}}{\underset{\|}{\text{C}}}-\text{O}-$$

and Y is —ONO₂.

10. A nitroalkyl nitrate in accordance with claim 1 where R and R¹ are hydrogen, X is phenyl $$\text{Phenyl}-\overset{\text{O}}{\underset{\|}{\text{C}}}-\text{O}-$$

and Y is —ONO₂.

11. A nitroalkyl nitrate in accordance with claim 1 where R and R¹ are hydrogen, X is —ONO₂ and Y is —ONO₂.

12. A nitroalkyl nitrate in accordance with claim 1 where R and R¹ are hydrogen, X is Cl and Y is —ONO₂.

13. A nitroalkyl nitrate in accordance with claim 1 where R and R¹ are hydrogen, X is C₂H₅—O— and Y is —ONO₂.

14. A nitroalkyl nitrate in accordance with claim 1 where R and R¹ are hydrogen, X is phenyl, and Y is —ONO₂.

15. A nitroalkyl nitrate in accordance with claim 1 where R is hydrogen, R¹ is methyl, X is Cl and Y is —ONO₂.

16. A nitroalkyl nitrate in accordance with claim 1 where R is hydrogen, R¹ is methyl, X is $$\text{CH}_3-\overset{\text{O}}{\underset{\|}{\text{C}}}-\text{O}-$$

and Y is —ONO₂.

17. A nitroalkyl nitrate in accordance with claim 1 where R and R¹ are hydrogen, X is —ONO₂ and Y is —OONO₂.

References Cited

UNITED STATES PATENTS 3,409,658  11/1968  Emmons _____ 260—467

LELAND A. SEBASTIAN, Primary Examiner

U.S. Cl. X.R.

44—72; 260—453 R, 453 P, 453 AL, 465.1, 467, 476 R, 478, 487, 488 R, 488 F, 610 R; 424—349

PO-1050
(5/69)

UNITED STATES PATENT OFFICE
CERTIFICATE OF CORRECTION

Patent No. 3,732,283      Dated May 8, 1973

Inventor(s) WILLIAM M. CUMMINGS

It is certified that error appears in the above-identified patent and that said Letters Patent are hereby corrected as shown below:

Col. 4, line 35, formula (c), change "$R-\underset{X}{\underset{|}{CH}}-\underset{R^1}{\underset{|}{C}}-CH_2-O_2$" to $$--R-\underset{X}{\underset{|}{CH}}-\underset{R^1}{\overset{\overset{ONO_2}{|}}{C}}-CH_2-NO_2--.$$

Col. 4, line 43, change "$CH_2-\overset{O}{\overset{||}{C}}-O-$" to $--CH_3-\overset{O}{\overset{||}{C}}-O---$.

Col 4, line 45, change "$CH_3(CH_3)-\overset{O}{\overset{||}{C}}-O-$" to $--CH_3(CH_2)_5-\overset{O}{\overset{||}{C}}-O---$ Col. 5, line 13, change "15" to --5--.

Signed and sealed this 25th day of September 1973.

(SEAL)
Attest:

EDWARD M.FLETCHER,JR.
Attesting Officer

RENE D. TEGTMEYER
Acting Commissioner of Patents